(12) United States Patent
Oikawa et al.

(10) Patent No.: US 7,522,015 B2
(45) Date of Patent: Apr. 21, 2009

(54) SWITCH CIRCUIT, FRONT END MODULE AND RADIO TERMINAL INCLUDING SWITCH CIRCUIT

(75) Inventors: Yuuichi Oikawa, Yokohama (JP); Osamu Hikino, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 195 days.

(21) Appl. No.: 11/705,785

(22) Filed: Feb. 14, 2007

(65) Prior Publication Data

US 2008/0100395 A1 May 1, 2008

(30) Foreign Application Priority Data

Oct. 27, 2006 (JP) ............... 2006-291964

(51) Int. Cl.
*H01P 1/10* (2006.01)
*H03H 7/46* (2006.01)
*H03H 9/00* (2006.01)

(52) U.S. Cl. ............... 333/103; 333/101; 333/132
(58) Field of Classification Search .......... 333/101, 333/103, 262, 132
See application file for complete search history.

(56) References Cited

U.S. PATENT DOCUMENTS

| 6,606,015 B2 * | 8/2003 | Uriu et al. ............... 333/132 |
| 7,057,472 B2 * | 6/2006 | Fukamachi et al. ......... 333/101 |
| 7,356,349 B2 * | 4/2008 | Furutani et al. .......... 455/552.1 |
| 7,398,059 B2 * | 7/2008 | Uejima et al. ............ 455/78 |
| 2003/0008693 A1 | 1/2003 | Tanaka et al. |

FOREIGN PATENT DOCUMENTS

| JP | 2001-267801 A | 9/2001 |
| JP | 2001-332902 | 11/2001 |
| JP | 2004-140696 | 5/2004 |
| JP | 2004-147166 | 5/2004 |
| JP | 2005-101762 | 4/2005 |
| WO | WO 2005/122417 A1 | 12/2005 |

OTHER PUBLICATIONS

Japanese Office Action, w/English translation thereof, issued in Japanese Patent Application No. JP 2006-291964 dated on Dec. 2, 2008.
German Office Action issued in German Patent Application No. DE 10 2007 005 676.3-35, dated Jun. 6, 2007.

* cited by examiner

*Primary Examiner*—Dean O Takaoka
(74) *Attorney, Agent, or Firm*—McDermott Will & Emery LLP

(57) ABSTRACT

A small-sized, low-cost radio frequency switch circuit, which has good characteristics of isolation between a transmission circuit and a reception circuit, includes a multi-layered substrate; a transmission line provided on the top surface of, or within, the multi-layered substrate; a first diode and a second diode connected respectively to both ends of the transmission line; a resistor, connected to the first diode, to apply a current to the first diode and the second diode; a first capacitor whose one end is connected to the resistor and whose other end is grounded; and a second capacitor connected in parallel to the transmission line.

9 Claims, 12 Drawing Sheets

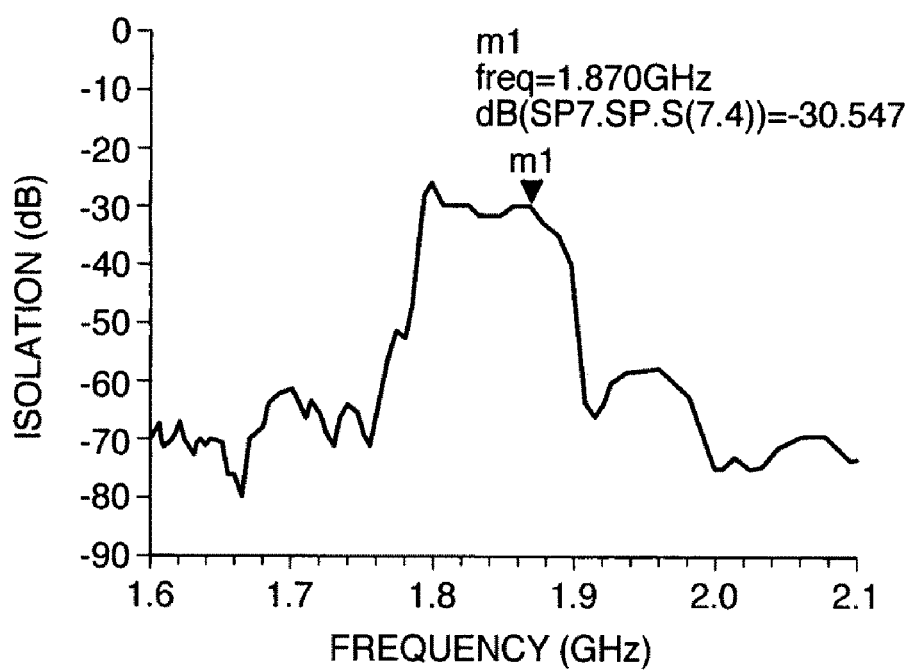

SWITCH CIRCUIT, FRONT END MODULE AND RADIO TERMINAL INCLUDING SWITCH CIRCUIT

INCORPORATION BY REFERENCE

The present application claims priority from Japanese application JP2006-291964 filed on Oct. 27, 2006, the content of which is hereby incorporated by reference into this application.

BACKGROUND OF THE INVENTION

1. Field of the Invention

The present invention relates to a switch circuit used for radio frequency communication system's devices for use in a mobile phone, a WLAN, or Bluetooth.

2. Description of the Related Art

Today, several systems, such as CDMA (Code Division Multiple Access) and TDMA (Time Division Multiple Access), are used for the mobile communication system for mobile phones and other devices.

The TDMA system is used for GSM (Global System For Mobile Communications) and PDC (Personal Digital Cellular). EGSM (Extended Global System For Mobile Communications) and DCS (Digital Cellular System), which are based on GSM, are used primarily in Europe. GSM850 (Global System For Mobile Communications 850) and PCS (Personal Communication Service) are used primarily in the United States. On the other hand, PDC is a system used in Japan.

Examples of small-sized, complex radio frequency circuit devices used for the multiple communication systems described above are as follows: dual-band radio frequency module used for a mobile wireless handset for EGSM and DCS, a triple-band radio frequency module used for EGSM, DCS, and PCS, and quad-band radio frequency module used for GSM850, EGSM, DCS, and PCS.

FIG. 1 shows the transmission (TR) frequencies and the reception (RC) frequencies of transmission/reception systems that are processed by the radio frequency circuit device. In the radio frequency circuit device described above, the frequency bands are allocated as follows. For GSM850, the frequency band of 824 to 849 MHz is allocated as the transmission frequency, and the frequency band of 869 to 894 MHz as the reception frequency. For EGSM, the frequency band of 880 to 915 MHz is allocated as the transmission frequency, and the frequency band of 925 to 960 MHz as the reception frequency.

For DCS, the frequency band of 1710 to 1785 MHz is allocated as the transmission frequency, and the frequency band of 1805 to 1880 MHz as the reception frequency. For PCS, the frequency band of 1850 to 1910 MHz is allocated as the transmission frequency, and the frequency band of 1930 to 1990 MHz as the reception frequency.

Today, to process multiple communication systems with one mobile wireless handset, a complex-module circuit is implemented using a radio frequency circuit device that uses a filter for passing the frequencies described above and a radio frequency switch for switching the transmission/reception circuit.

There has been a requirement for a complex-module circuit as well as for a small-sized, lightweight mobile wireless handset and this requirement, in turn, creates a requirement for a small-sized radio frequency circuit device. However, an increase in the integration of a radio frequency circuit device narrows the spacing between the circuits, causing a problem of insufficient isolation between the circuits.

An insufficient isolation between the reception circuit and the transmission circuit in the front end part in the system of a mobile wireless handset sometimes causes damage to the LNA (Low Noise Amplifier) or a malfunction in the IC. In general, the stable operation of the system requires the isolation of 35 dB or higher.

However, a front end module using a standard radio frequency switch, such as the one shown in FIG. 2A, provides an isolation of about 30 dB as shown in FIG. 2B in the frequency band of 1850 to 1880 MHz where the pass bands are overlapped, for example, in the band area where the PCS transmission band and the DCS reception band are overlapped as shown in FIG. 1.

Technologies for providing isolation when pass bands are overlapped are disclosed, for example, in JP-A-2004-147166 (Patent Document 1), JP-A-2005-101762 (Patent Document 2), and JP-A-2004-140696 (Patent Document 3).

Patent Documents 1 and 2 disclose a configuration in which a third switching circuit SW3 is added between a reception circuit and a reception output terminal or a reception filer as shown in FIG. 3 to provide isolation. According to the technology disclosed in Patent Documents 1 and 2, switching is performed in two stages, first switching circuit SW1 and third switching circuit SW3, at transmission time to prevent the transmission signal from being leaked into the reception circuit or the reception filter.

Patent Documents 1 and 2 describe a radio frequency switch circuit using a PIN (Positive-Intrinsic-Negative) diode, while Patent Document 3 proposes a front end module, an antenna switch module, etc., that improve isolation using a semiconductor switch, for example, a field-effect transistor switch such as a GaAs (Gallium Arsenide) switch or a CMOS (Complementary Metal Oxide Semiconductor) switch.

However, the third switching circuit SW3 described above, which is added to provide isolation, increases the circuit size of the front end part and prevents a reduction in the circuit size. At the same time, the devices added to configure the third switching circuit SW3 increases the cost.

SUMMARY OF THE INVENTION

The present invention is provided to solve the above problems. It is an object of the present invention to provide a small-sized, low-cost radio frequency switch circuit, capable of providing an isolation of 35 dB or higher without adding a new third switch circuit even in a frequency band where the transmission frequency band and the reception frequency band are partially overlapped, and a radio frequency circuit device including the radio frequency switch circuit.

To achieve the above object, the radio frequency switch circuit according to the present invention has a configuration in which a capacitor is connected in parallel to a transmission line in the switch circuit.

According to the present invention, a small-sized radio frequency switch circuit, capable of providing an isolation of 35 dB or higher even in a frequency band where the transmission frequency band and the reception frequency band are partially superimposed, and a radio frequency circuit device including the radio frequency switch circuit can be provided at a low cost.

Other objects, features and advantages of the invention will become apparent from the following description of the embodiments of the invention taken in conjunction with the accompanying drawings.

BRIEF DESCRIPTION OF THE DRAWINGS

FIG. 2B is a graph showing the simulation result of the characteristics of isolation between PCS Tx and DCS Rx.

DESCRIPTION OF THE EMBODIMENTS

Embodiments of a switch circuit according to the present invention and a front end module and a mobile wireless handset including the switch circuit will be described below.

In the description of the embodiments below, a radio frequency switch circuit, which is fabricated by mounting the circuit devices on the top surface of a dielectric multi-layered substrate of LTCC (Low Temperature Cofired Ceramics) or HTCC (High Temperature Cofired Ceramics) or fabricated by building the circuit devices into the dielectric multi-layered substrate, will be described as an example of the radio frequency switch circuit of the present invention. A front end module including the radio frequency switch circuit will also be described.

The following describes the embodiments of a radio frequency switch circuit according to the present invention and a radio frequency circuit device including the radio frequency switch circuit with reference to the drawings. In the attached drawings, L indicates an inductor (transmission line), C and Ca indicate a capacitor, D indicates a PIN diode, R indicates a resistor, Ant and ANT indicate an antenna terminal, Tx indicates a transmission terminal, Rx indicates a reception terminal, Vc indicates a control power terminal, SW indicates a switch circuit, SAW indicates a surface acoustic wave filter, DIP indicates an antenna diplexer (branching filter), LPF indicates a low-pass filter, and HPA indicates a high-power amplifier (high power amplifier).

Figure 1:
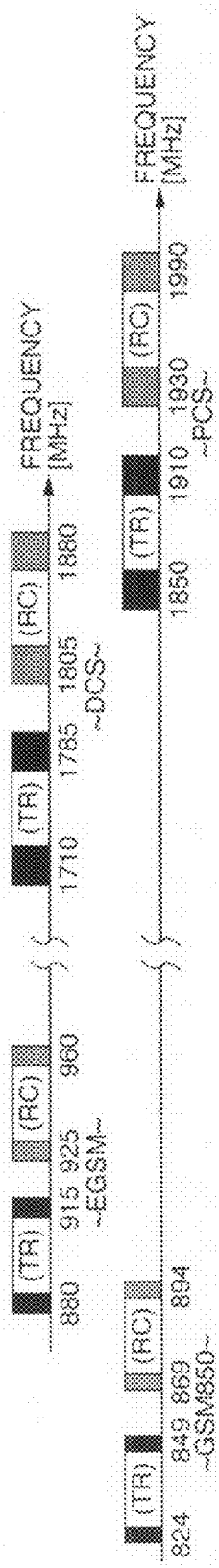
FIG. 1 is a diagram showing an example of the frequency layout of the TDMA communication system.
Figure 2A:
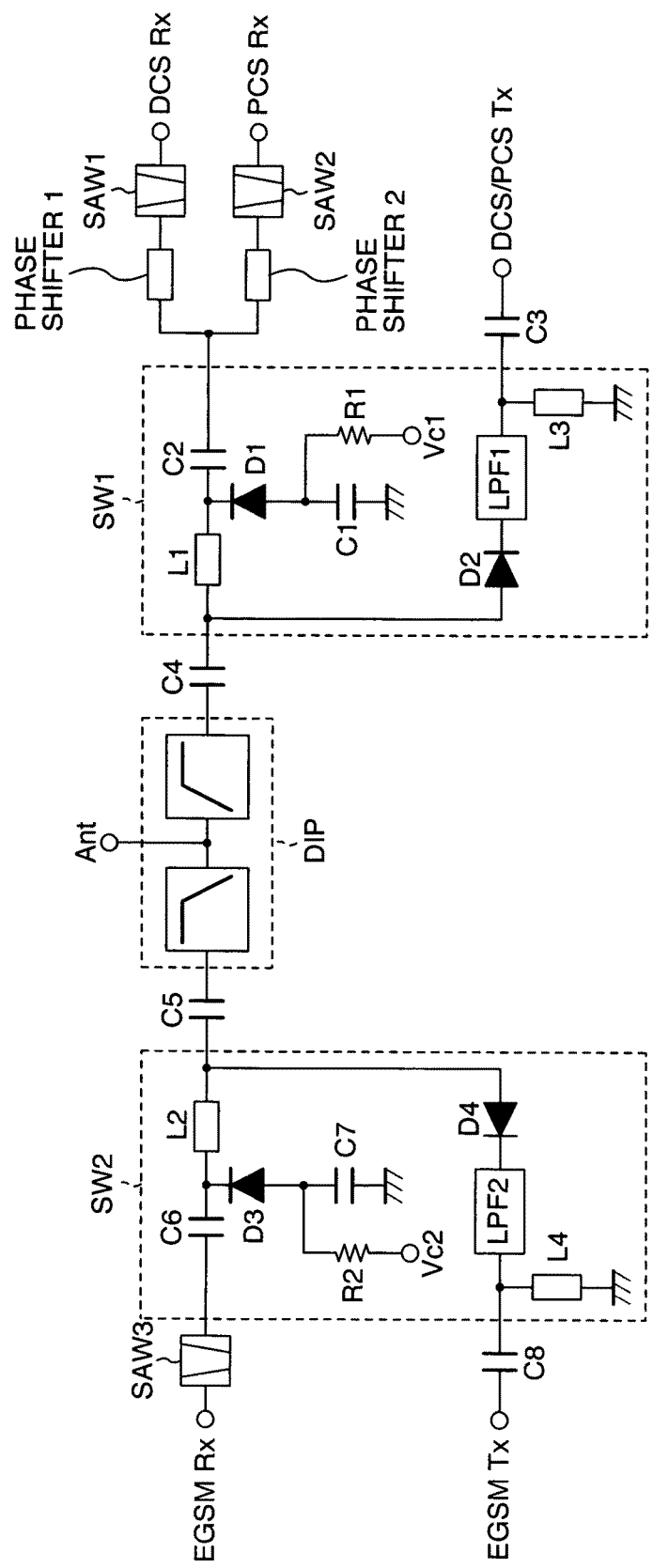
FIG. 2A is a diagram showing the equivalent circuit of a front end module using a standard switch circuit.
Figure 3:
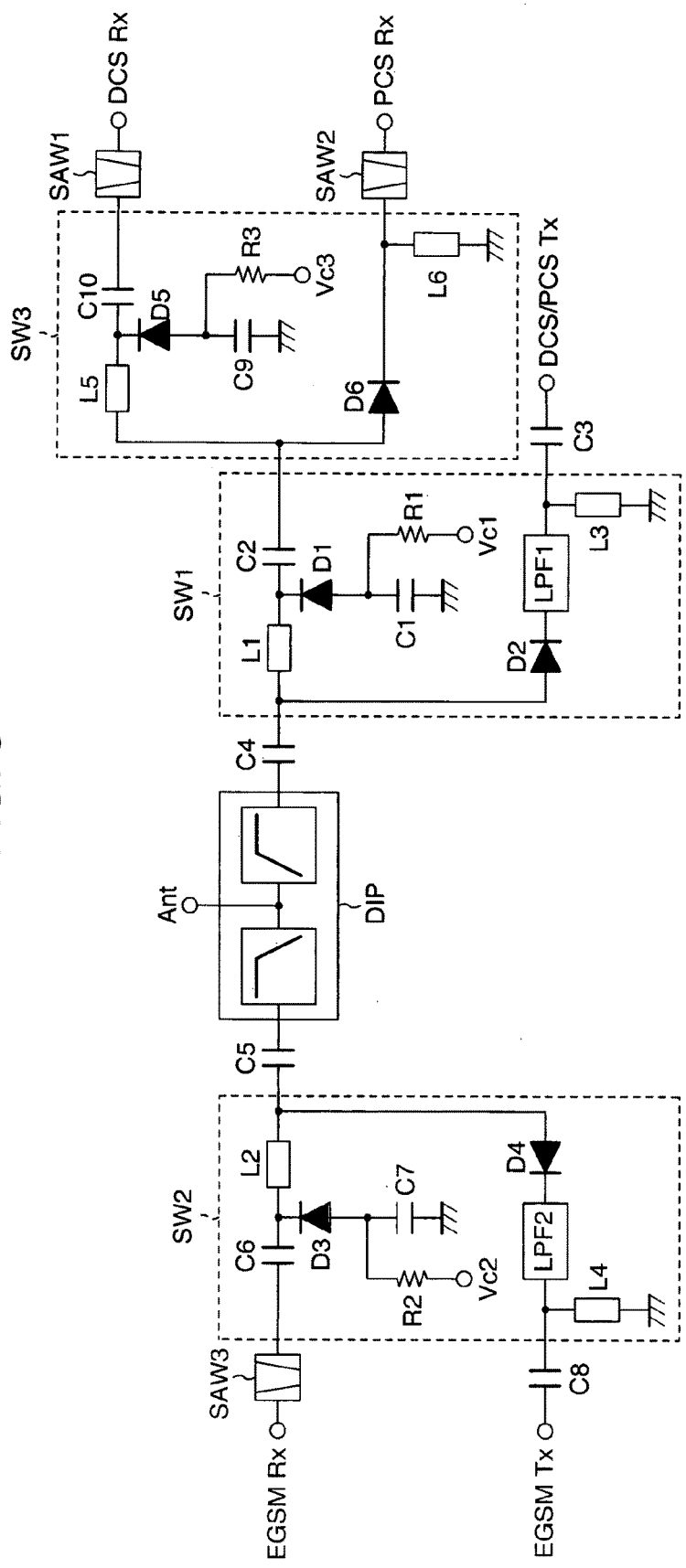
FIG. 3 is a diagram showing the equivalent circuit of a front end module to which a switch circuit is added to assure isolation between PCS Tx and DCS Rx.
Figure 4A:
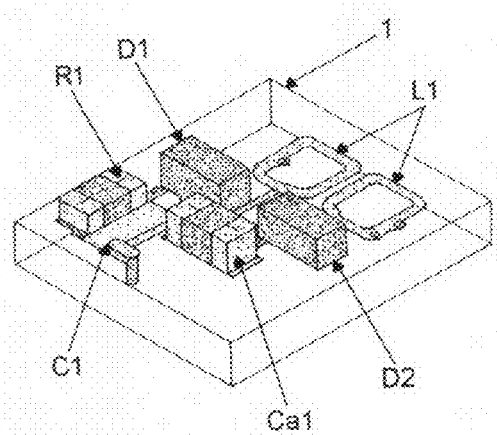
FIG. 4A is a perspective diagram of a switch circuit in a first embodiment of the present invention.
Figure 4B:
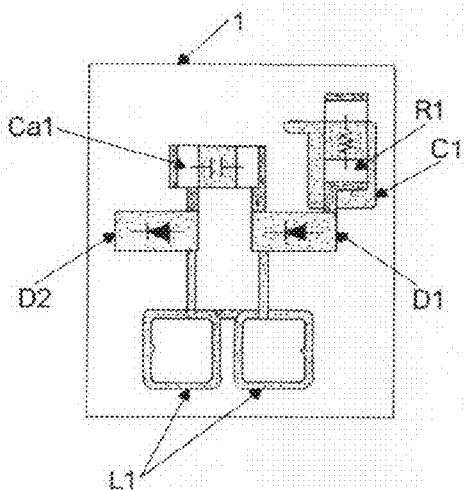
FIG. 4B is a perspective diagram viewed from top.

FIG. 4A and FIG. 4B are schematic diagrams showing a switch circuit in a first embodiment of the present invention. A dielectric multi-layered substrate 1 is made of LTCC or HTCC. The switch circuit shown in FIG. 4A and FIG. 4B has a configuration in which PIN diodes D1 and D2, a resistor R1, and a capacitor Ca1 are mounted on the top surface of the dielectric multi-layered substrate 1 and a transmission line L1 and a capacitor C1 are built in the dielectric multi-layered substrate.

The transmission line L1 is set to a length in such a way that it functions as a λ/4 transformer at the operating frequency. The resistor R1 determines the current that flows to the diodes D1 and D2 when a control power Vc1 is high.

The capacitor C1 not only blocks the flow of DC from the control power but also adjusts the isolation between the transmission circuit and the reception circuit. Although built in the dielectric multi-layered substrate in this example, the capacitor C1 may also be a chip device mounted on the top surface of the dielectric multi-layered substrate.

The capacitor Ca1 is connected in parallel to the transmission line L1 to further improve the characteristics of isolation between the transmission circuit and the reception circuit. Changing the capacitance of this capacitor allows the isolation between the transmission circuit and the reception circuit to be adjusted and optimized.

Figure 5A:
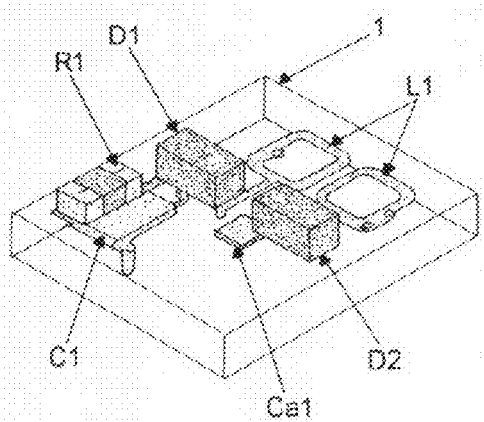
FIG. 5A is a perspective diagram of a switch circuit in a second embodiment of the present invention.
Figure 5B:
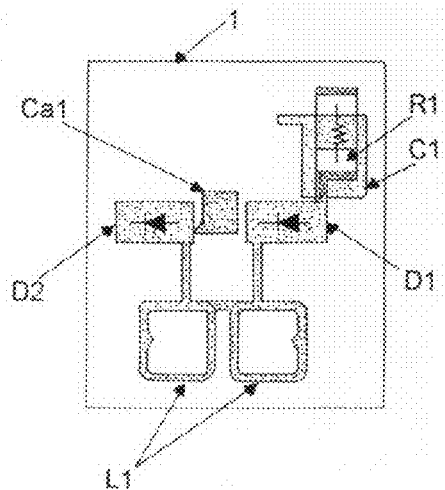
FIG. 5B is a perspective diagram viewed from top.

FIG. 5A and FIG. 5B are schematic diagrams of a switch circuit in a second embodiment of the present invention. This switch circuit has the same structure as that of the first embodiment of the present invention except that a capacitor Ca1 is formed as a pattern inside a dielectric multi-layered substrate. Forming the capacitor Ca1 inside the dielectric multi-layered substrate reduces the device mounting cost of the capacitor.

Figure 6:
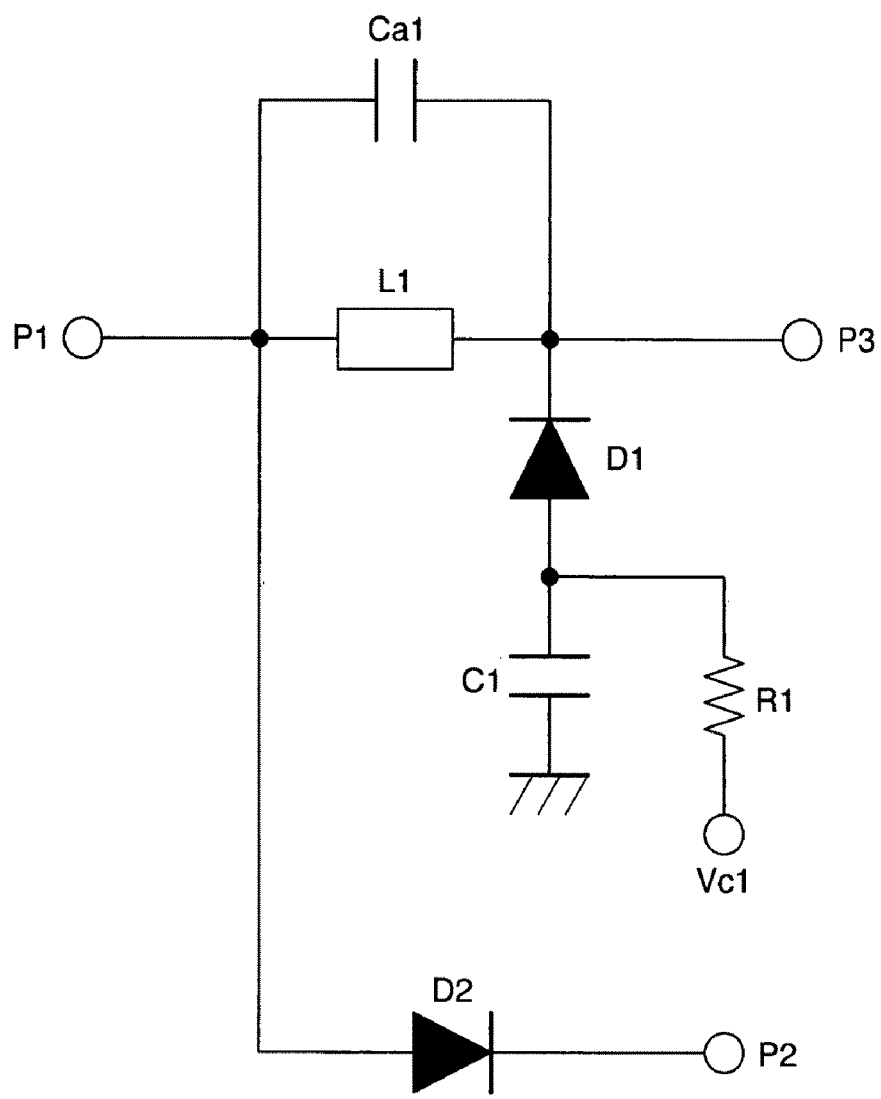
FIG. 6 is a diagram showing the equivalent circuit of the switch circuit in the first and second embodiments of the present invention.

FIG. 6 shows is a diagram showing the equivalent circuit of the switch circuit in the first embodiment and the second embodiment of the present invention. In this figure, P1 indicates the point of connection to the antenna diplexer, P2 indicates the point of connection to the low-pass filter and the transmission circuit, and P3 indicates the point of connection to the phase shifter, reception circuit, and reception filter. As shown in FIG. 6, the capacitor Ca1 mounted in parallel to the transmission line L1 gives better isolation than when the capacitor Ca1 is not mounted.

Figure 7A:
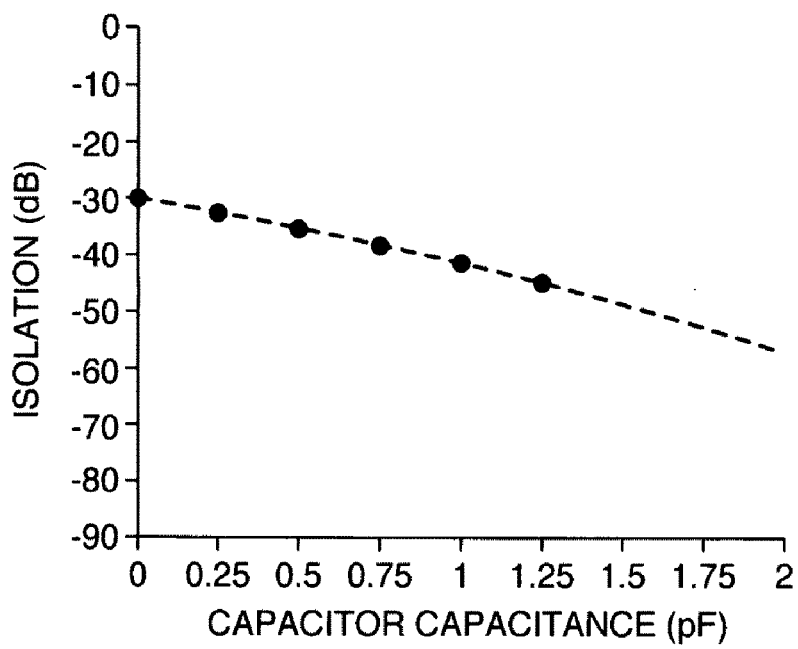
FIG. 7A is a graph showing the capacitance of a capacitor and a change in the characteristics of isolation between PCS Tx and DCS Rx.
Figure 7B:
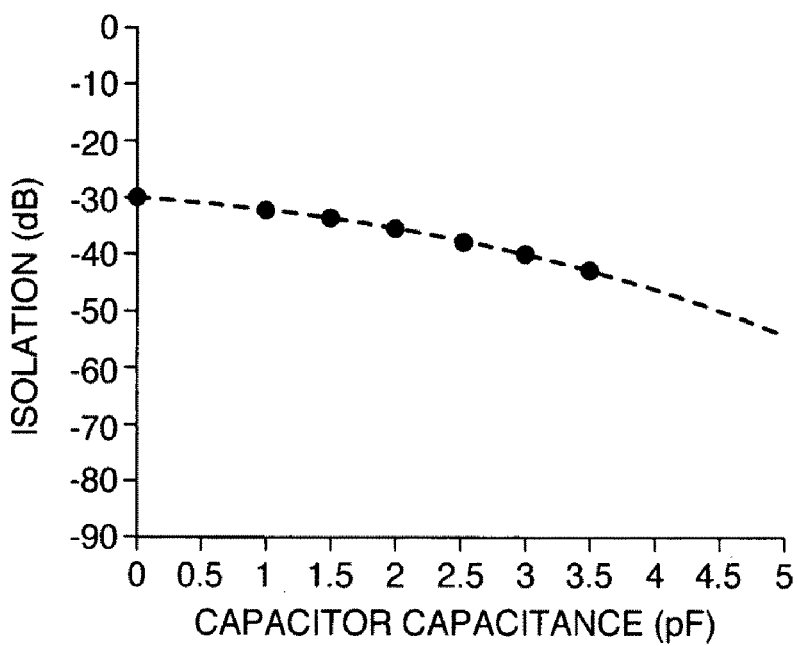
FIG. 7B is a graph showing the capacitance of a capacitor and a change in the characteristics of isolation between EGSM Tx and GSM850 Rx, in the first and second embodiments of the present invention.

FIG. 7A and FIG. 7B are graphs showing the simulation result of the characteristics of isolation between transmission circuit and reception circuit when the capacitance of the capacitor Ca1 is changed in the first and second embodiments of the present invention. FIG. 7A is a graph showing the relation between the capacitance of the capacitor Ca1 and the characteristics of isolation between PCS Tx and DCS Rx. FIG. 7B is a graph showing the relation between the capacitance of the capacitor Ca1 and the characteristics of isolation between EGSM Tx and GSM850 Rx in the frequency band of 880 to 894 MHz where the EGSM transmission band and the GSM850 reception band are overlapped.

The graphs given above indicate that assuring an isolation of 35 dB or higher between the transmission circuit and the reception circuit in this embodiment requires that the capacitance 0.5 pF or higher be added to provide sufficient isolation between PCS Tx and DCS Rx and that the capacitance of 2 pF or higher be added to provide sufficient isolation between EGSM Tx and GSM850 Rx.

Figure 8A:
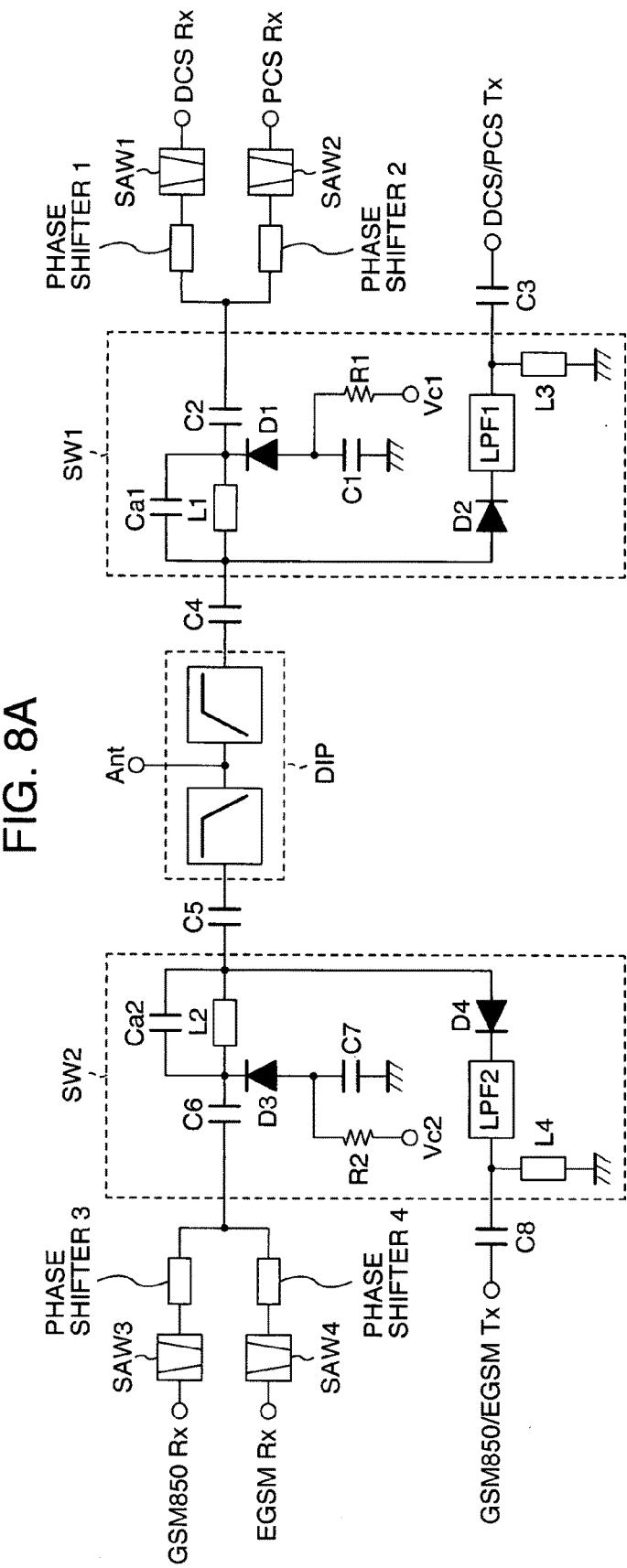
FIG. 8A is a diagram showing the equivalent circuit of a quad-band front end module using a radio frequency switch circuit in a third embodiment of the present invention.
Figure 10:
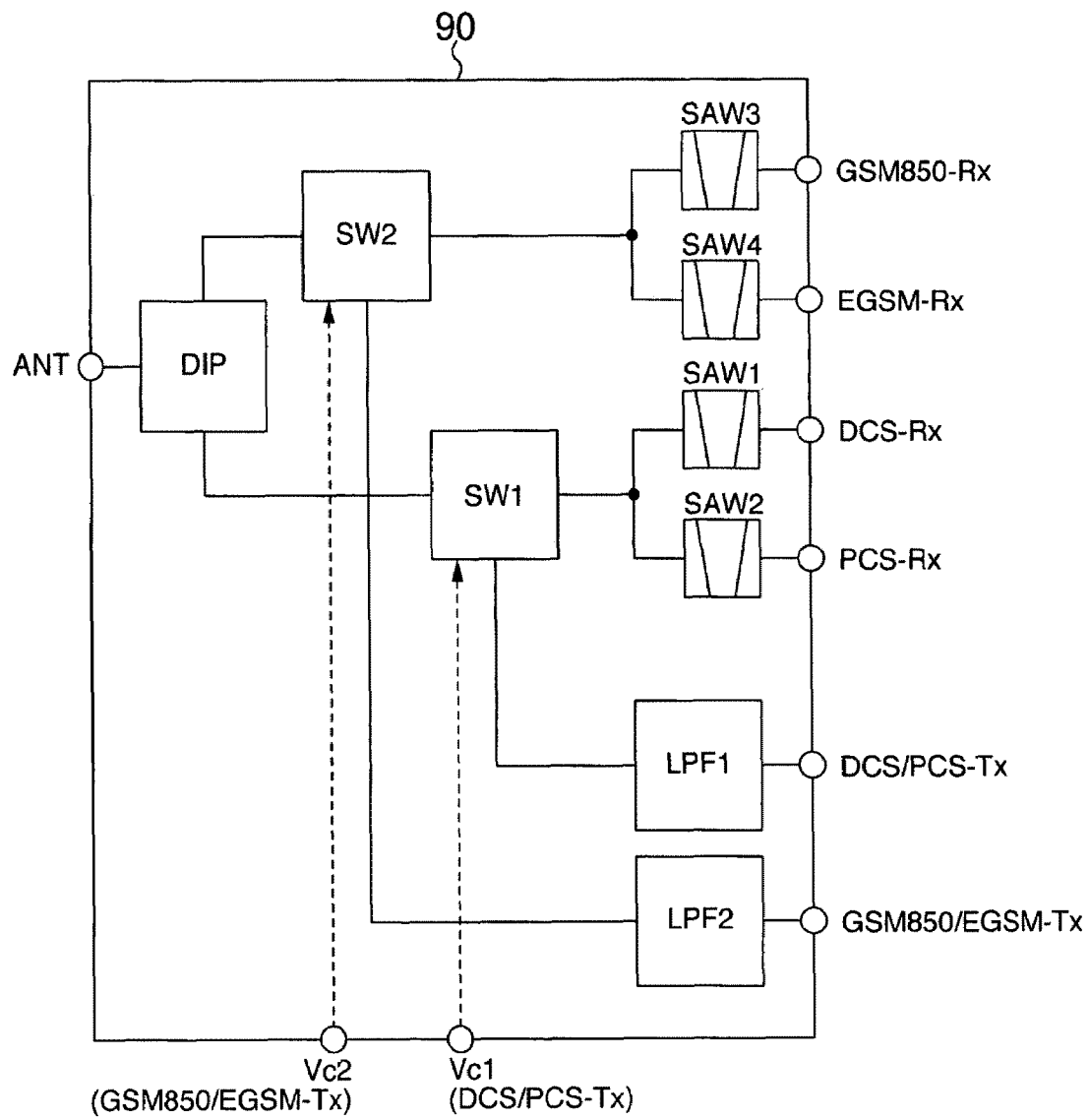
FIG. 10 is a block diagram showing the front end module using the radio frequency switch circuits of the present invention.

FIG. 8A is a diagram showing the equivalent circuit of a quad-band front end module that uses a switch circuit in a third embodiment of the present invention as a first switch circuit SW1 and a second switch circuit SW2. FIG. 10 is a block diagram showing a quad-band front end module 90 that uses the switch circuit in the third embodiment.

In this embodiment, the capacitance of the capacitor connected in parallel to a transmission line L1 is set to 1.0 pF that ensures matching to minimize the insertion loss when the switch circuit is connected to the antenna diplexer DIP or the reception circuit including a phase shifter and that provides isolation of 35 dB or higher between PCS Tx and DCS Rx. For the same reason, the capacitance of a capacitor Ca2 connected in parallel to a transmission line L2 is set to 3.0 pF.

The capacitances of the capacitors Ca1 and Ca2 are not limited to those given above but may be changed according to the frequency band used.

In this embodiment, the capacitor that is inserted may also be formed as a pattern in the substrate.

Figure 8B:
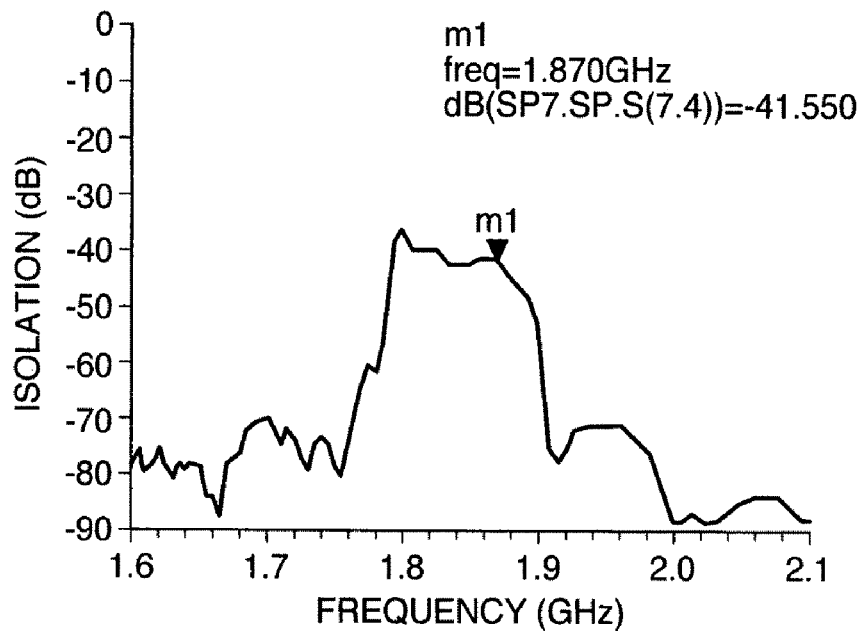
FIG. 8B is a graph showing simulation result of the characteristics of isolation between PCS Tx and DCS Rx.
Figure 8C:
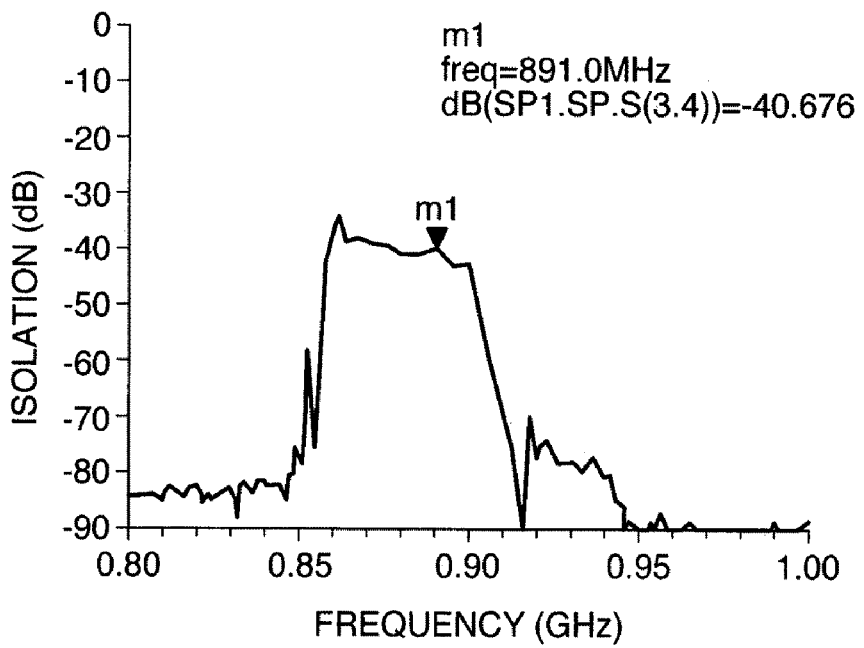
FIG. 8C is a graph showing the simulation result of the characteristics of isolation between EGSM Tx and GSM850 Rx.

FIG. 8B and FIG. 8C show respectively the simulation result of the characteristics of isolation between PCS Tx and DCS Rx, and the simulation result of the characteristics of isolation between EGSM Tx and GSM850 Rx, of the front end module in this embodiment. FIG. 8B and FIG. 8C indicate that the radio frequency switch circuit of the present invention significantly improves the characteristics of isolation even in a frequency band where the transmission frequency band and the reception frequency band are partially overlapped.

Figure 9:
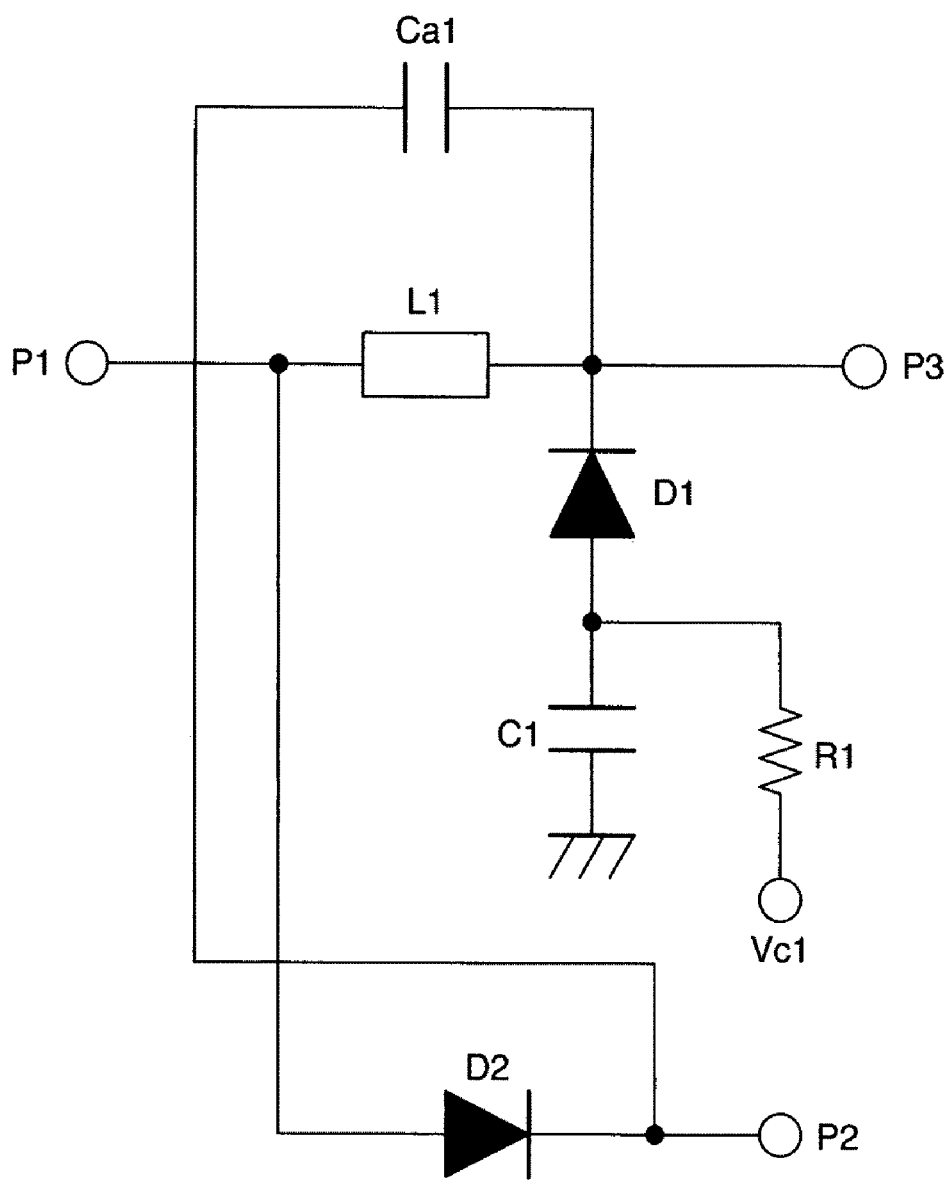
FIG. 9 is a diagram showing the equivalent circuit of the configuration of the radio frequency switch circuit of the present invention in which a capacitor connected in parallel to a transmission line is connected to the cathode side of a diode D2.

Although the capacitor added in parallel to the transmission line is connected to the anode side of the diode D2 as shown in FIG. 6 in the examples and embodiments above, the same effect can be achieved also by connecting the diode D2 to the cathode side as shown in FIG. 9 because the diodes D1 and D2 are connected electrically at transmission time.

Although the PIN diode is used as the switch device to configure the switch circuit in the examples and embodiments above, the same effect can be achieved also by using a semiconductor switch, for example, a field-effect transistor switch such as a GaAs switch or a CMOS switch.

Although the isolation between a transmission circuit and a reception circuit at a specific frequency has been described in the examples and embodiments above, the present invention can be applied also to a frequency not mentioned in the embodiments. That is, the isolation can be improved by connecting the capacitor in parallel to the transmission line even in a frequency band, where the reception frequency band of one circuit and the transmission frequency band of another are partially overlapped, to adjust and optimize the capacitance of this capacitor.

Not only the dielectric multi-layered substrate of LTCC and HTCC but also an IPD (Integrated Passive Device) of silicon may be used for the module substrate in which the devices of the radio frequency switch circuit of the present invention are built.

Figure 11:
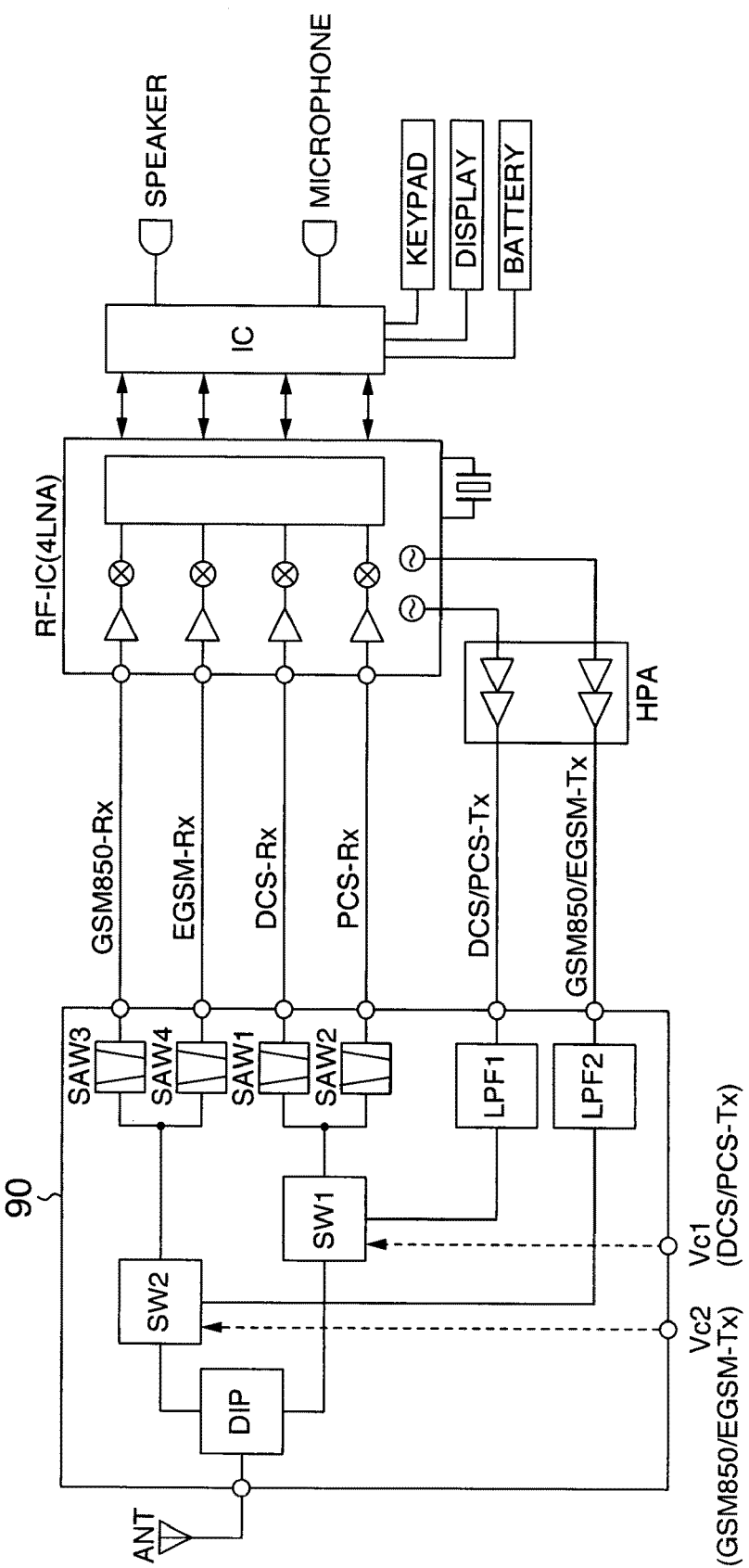
FIG. 11 is a block diagram showing a mobile wireless handset using the front end module that has the radio frequency switch circuits of the present invention.

FIG. 11 is a block diagram showing a mobile wireless handset using the front end module 90 that has the radio frequency switch circuit of the present invention. As shown in FIG. 11, the mobile wireless handset includes an antenna (ANT), front end module 90, RF-IC, HPA, IC, speaker, microphone, keypad, display, and battery.

According to the present invention, a small-sized, low-cost front end unit having the characteristics of isolation of 35 dB or higher between the transmission circuit and the reception circuit can be efficiently configured. This front end unit can reduce the possibility of damage to, and a malfunction in, the LNA and IC caused by an insufficient isolation between the transmission circuit and the reception circuit.

The radio frequency switch circuit of the present invention gives better characteristics of isolation between the transmission circuit and the reception circuit without adding a switch circuit to the reception circuit side even in a frequency band where the transmission frequency band and the reception frequency band are partially overlapped.

It should be further understood by those skilled in the art that the foregoing description has been made on embodiments of the invention and that various changes and modifications may be made in the invention without departing from the spirit of the invention and the scope of the appended claims.

The invention claimed is:

1. A switch circuit comprising:
   a multi-layered substrate;
   a transmission line provided on a top surface of, or within, said multi-layered substrate;
   a first diode and a second diode connected respectively to both ends of said transmission line;
   a resistor, connected to said first diode, to apply a current to said first diode and said second diode;
   a first capacitor whose one end is connected to said resistor and whose other end is grounded; and
   a second capacitor connected in parallel to said transmission line.

2. The switch circuit according to claim 1 wherein said second capacitor is mounted on the top surface of said multi-layered substrate as a chip part.

3. The switch circuit according to claim 1 wherein said second capacitor is provided within said dielectric multi-layered substrate.

4. The switch circuit according to claim 1 wherein said switch circuit operates at a frequency of 824 to 960 MHz and a capacitance of said second capacitor is 0.25 to 5.0 pF.

5. The switch circuit according to claim 1 wherein said switch circuit operates at a frequency of 1710 to 1990 MHz and a capacitance of said second capacitor is 0.25 to 2.0 pF.

6. The switch circuit according to claim 1 wherein a ceramic substrate is used for said multi-layered substrate.

7. The switch circuit according to claim 1 wherein a silicon substrate is used for said multi-layered substrate.

8. A front end module comprising:
   a switch circuit including
      a multi-layered substrate,
      a transmission line provided on a top surface of, or within, said multi-layered substrate,
      a first diode and a second diode connected respectively to both ends of said transmission line,
      a resistor, connected to said first diode, to apply a current to said first diode and said second diode,
      a first capacitor whose one end is connected to said resistor and whose other end is grounded, and
      a second capacitor connected in parallel to said transmission line;
   a diplexer connected to said switch circuit and an antenna; and
   a surface acoustic wave filter connected to said switch circuit.

9. A radio terminal comprising:
   a front end module including
      a switch circuit including
         a multi-layered substrate, a transmission line provided on a top surface of, or within, said multi-layered substrate,
a first diode and a second diode connected respectively to both ends of said transmission line,
a resistor, connected to said first diode, to apply a current to said first diode and said second diode,
a first capacitor whose one end is connected to said resistor and whose other end is grounded, and
a second capacitor connected in parallel to said transmission line,
a diplexer connected to said switch circuit and an antenna, and
surface acoustic wave filter connected to said switch circuit,
a high power amplifier connected to a transmission terminal of said front end module; and
a Radio Frequency Integrated Circuit connected to a reception terminal of said front end module.

* * * * *